US009093123B2

(12) United States Patent
Okazaki et al.

(10) Patent No.: US 9,093,123 B2
(45) Date of Patent: Jul. 28, 2015

(54) DISK DRIVE STOPPER FORMED FROM SELF-RESTORING SHEET

(71) Applicant: Panasonic Corporation, Kadoma-shi, Osaka (JP)

(72) Inventors: Yusuke Okazaki, Osaka (JP); Mitsuo Imanishi, Osaka (JP); Takeshi Tanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/327,181

(22) Filed: Jul. 9, 2014

(65) Prior Publication Data

US 2015/0095924 A1    Apr. 2, 2015

(30) Foreign Application Priority Data

Oct. 1, 2013   (JP) .................................. 2013-206074
Jun. 13, 2014  (JP) .................................. 2014-121947

(51) Int. Cl.
  *G11B 33/00*   (2006.01)
  *G11B 33/14*   (2006.01)
  *F16F 7/00*    (2006.01)

(52) U.S. Cl.
  CPC . *G11B 33/14* (2013.01); *F16F 7/00* (2013.01); *G11B 33/005* (2013.01)

(58) Field of Classification Search
  CPC ... G11B 33/005; G11B 7/1201; G11B 23/287
  USPC .......................................... 720/646, 671, 673
  See application file for complete search history.

(56) References Cited

U.S. PATENT DOCUMENTS

| 4,794,587 | A | * | 12/1988 | Cordiano | 369/292 |
| 5,022,242 | A | * | 6/1991 | Povilaitis | 70/14 |
| 5,305,621 | A | * | 4/1994 | Broadwater | 70/14 |
| 5,630,330 | A | * | 5/1997 | Kung | 70/58 |
| 5,995,467 | A | * | 11/1999 | Ohyama et al. | 369/71 |
| 6,053,017 | A | * | 4/2000 | Ling | 70/58 |
| 6,603,723 | B2 | * | 8/2003 | Minase | 720/673 |
| 7,007,288 | B2 | * | 2/2006 | Tabor et al. | 720/671 |
| 7,174,558 | B2 | * | 2/2007 | Kobayashi | 720/673 |
| 7,193,855 | B2 | * | 3/2007 | Fan et al. | 361/724 |
| 7,287,783 | B2 | * | 10/2007 | Crossley | 292/35 |
| 8,185,920 | B2 | * | 5/2012 | Wang et al. | 720/646 |
| 2006/0201693 | A1 | * | 9/2006 | Lin | 174/66 |

FOREIGN PATENT DOCUMENTS

JP    8-115531    5/1996

* cited by examiner

*Primary Examiner* — Brian Miller
(74) *Attorney, Agent, or Firm* — Hamre, Schumann, Mueller & Larson, P.C.

(57) ABSTRACT

The disk drive includes: a box-shaped exterior casing having an opening on one side face; a tray stored in the exterior casing and having a mounting face; a pickup; and a rail being a recessed portion formed on the mounting face as a path along which the pickup moves. The stopper is formed of a sheet member having a self-restoring property which allows the sheet member to return to a flat plate shape, and includes: a restricting portion; a connecting portion; and a tab portion, which are formed by folding the sheet member. When the stopper is stored in the disk drive, the stopper is disposed such that the restricting portion is disposed in the inside of the rail, the connecting portion is disposed on the mounting face, and the tab portion projects outside through a gap formed between the tray and the exterior casing.

6 Claims, 6 Drawing Sheets

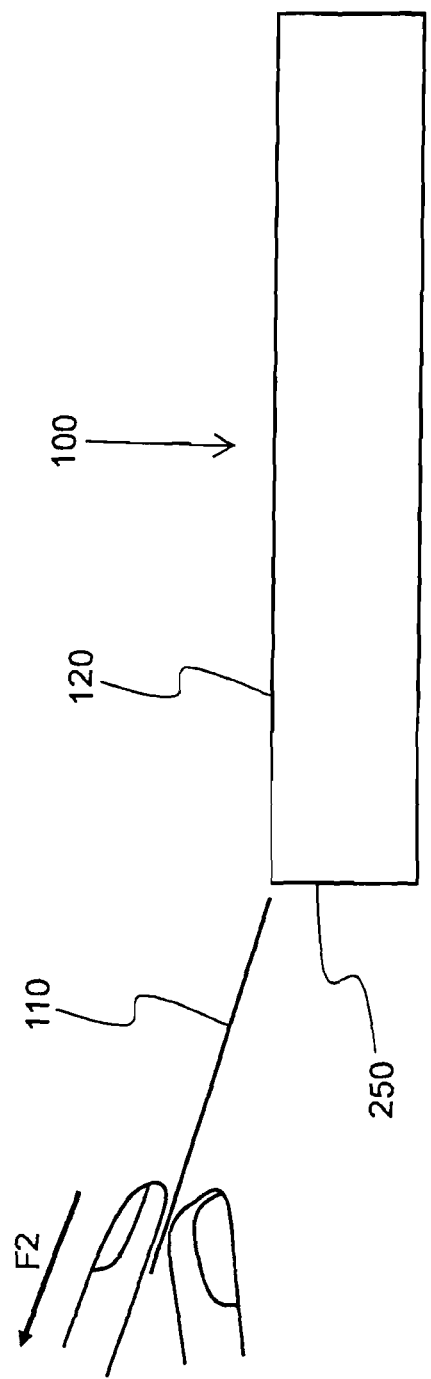

DISK DRIVE STOPPER FORMED FROM SELF-RESTORING SHEET

BACKGROUND OF THE INVENTION

1. Field of the Invention

This disclosure relates to a stopper which fixes a head of a disk drive.

2. Description of the Related Art

Unexamined Japanese Patent Publication No. 8-115531 discloses a head fixing unit of an optical disk device. The head fixing unit is provided for fixing an optical head in the inside of the optical disk device when the optical disk device is transported. A bag body is inserted into and disposed in a disk cartridge storing portion in the optical disk device, and the optical head is held and fixed by filling the bag body with air.

SUMMARY OF THE INVENTION

This disclosure provides a stopper which can restrict the movement of a pickup of a disk drive, and can be easily removed from the disk drive.

In this disclosure, the disk drive on which a stopper is mounted includes: a box-shaped exterior casing having an opening on one side face; a tray stored in the exterior casing and having a mounting face; a pickup; and a rail being a recessed portion formed on the mounting face as a path along which the pickup moves. In the disk drive having such a configuration, the stopper is formed of a sheet member having a self-restoring property which allows the sheet member to return to a flat plate shape, and includes: a restricting portion; a connecting portion; and a tab portion, which are formed by folding the sheet member. When the stopper is stored in the disk drive, the restricting portion is disposed in the inside of the rail, the connecting portion is disposed on the mounting face, and the tab portion projects outside through a gap formed between the tray and the exterior casing.

The stopper according to this disclosure can restrict the movement of the pickup of the disk drive, and can be easily removed from the disk drive.

BRIEF DESCRIPTION OF DRAWINGS

FIG. 6 is a view showing a manner of operation of removing the stopper from the disk drive of the exemplary embodiment.

DETAILED DESCRIPTION OF THE PREFERRED EMBODIMENT

Hereinafter, an exemplary embodiment will be described in detail with reference to the drawings as appropriate. However, descriptions in more detail than necessary may be omitted. For example, the detailed description with respect to the matters which have been already well-known and the repeated description with respect to the substantially same configurations may be omitted. This is to avoid the following descriptions from being unnecessarily redundant and to allow those skilled in the art to easily understand the present disclosure.

Further, the accompanying drawings and the following descriptions are provided to allow those skilled in the art to fully understand the present disclosure, and the subject defined in the claims is not intended to be limited thereby.

Exemplary Embodiment

Hereinafter, the exemplary embodiment will be described with reference to FIGS. 1 to 6.

[1-1. Configuration]

[1-1-1. Overall Configuration]

Figure 1:
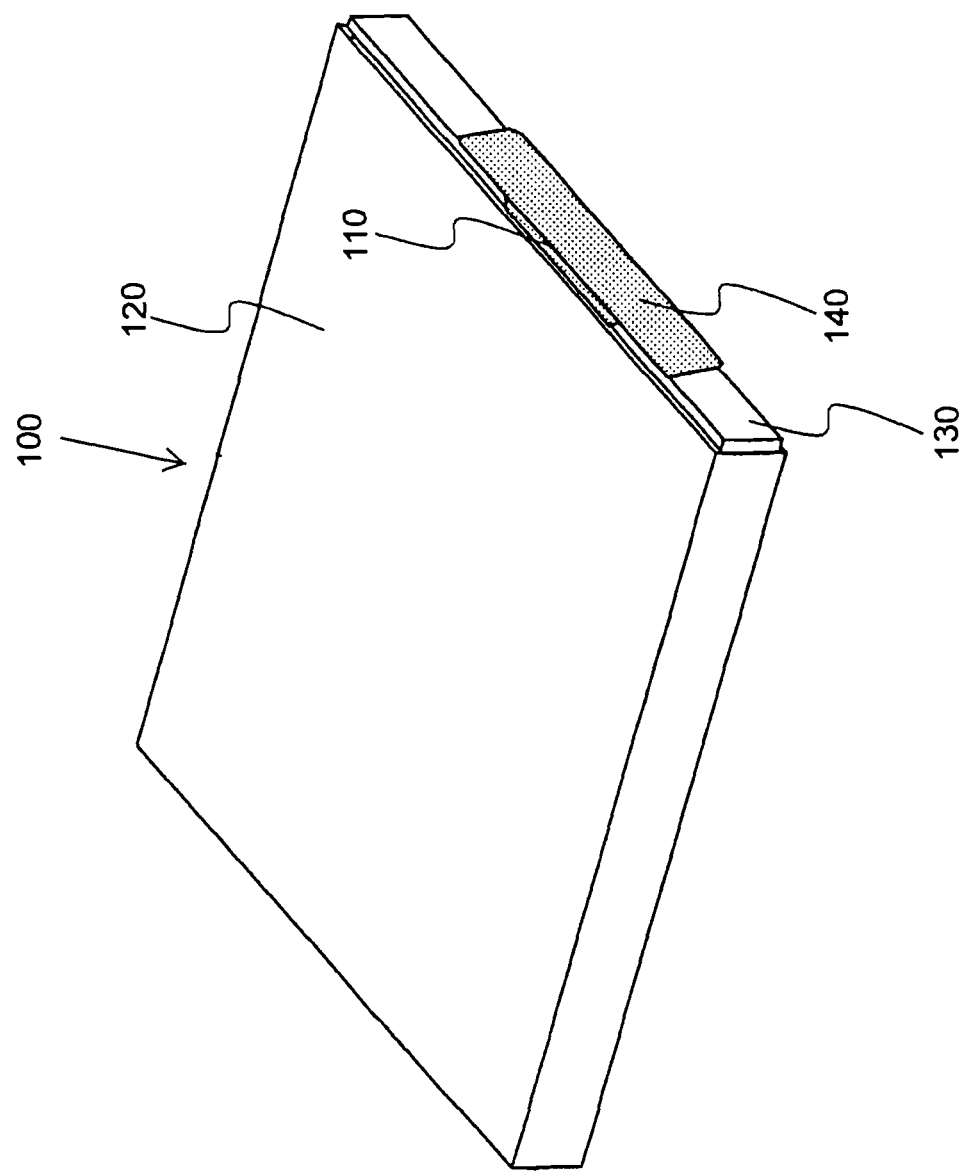
FIG. 1 is a view showing an appearance of an overall configuration of a disk drive into which a stopper according to an exemplary embodiment is mounted.

FIG. 1 is a view showing an appearance of an overall configuration of a disk drive into which a stopper according to the exemplary embodiment is mounted.

Disk drive 100 stores a disk (not shown) therein. Disk drive 100 is a device which records information on the disk and reads information from the disk. Stopper 110 is stored in disk drive 100. Disk drive 100 includes exterior casing 120 and tray 130. Tray 130 is stored in exterior casing 120.

Stopper 110 includes tab portion 140. Tab portion 140 is a portion which projects outside through a gap formed between exterior casing 120 of disk drive 100 and tray 130 of disk drive 100.

[1-1-2. Configuration of Disk Drive]

Figure 2:
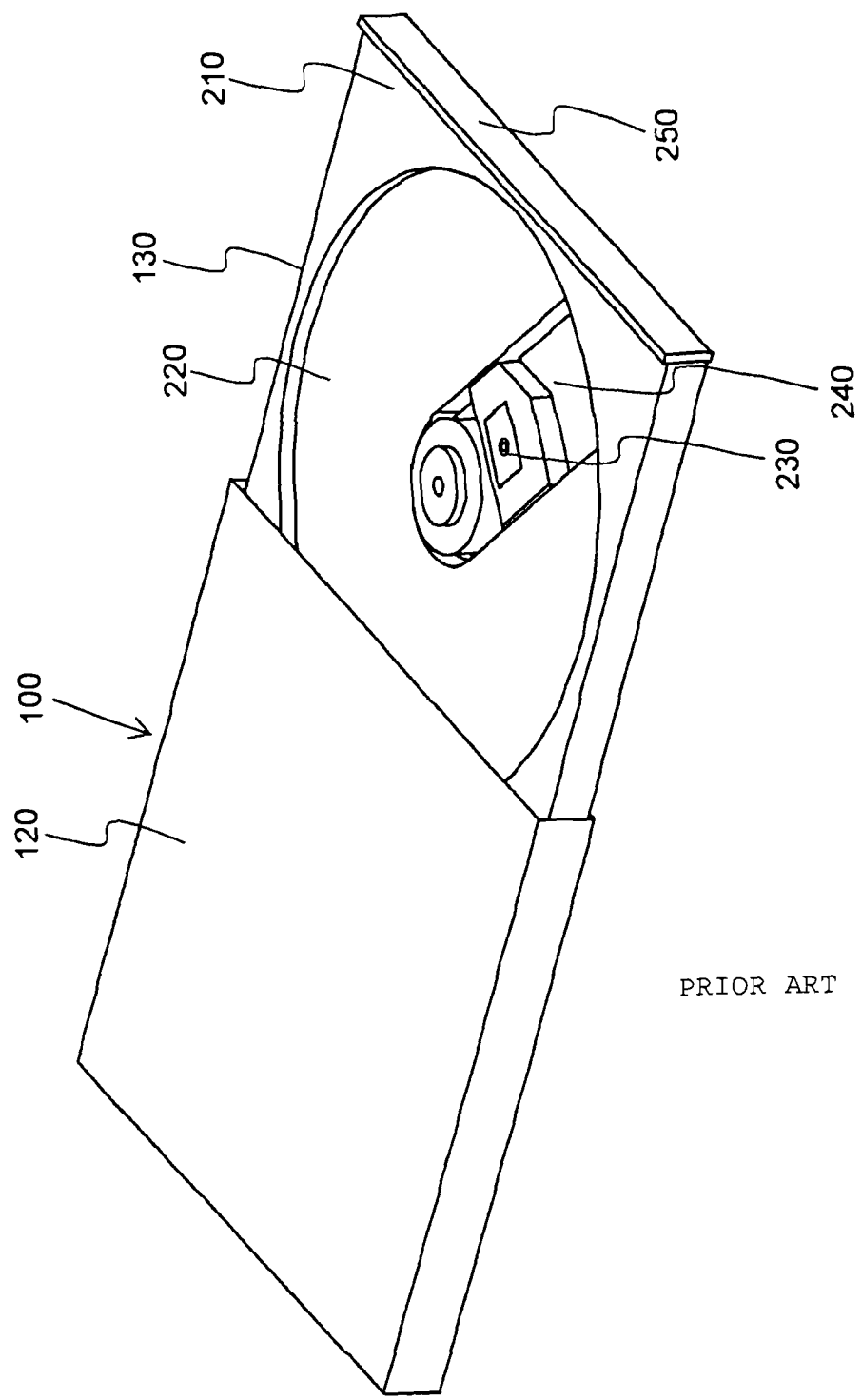
FIG. 2 is a configuration view of the disk drive of the exemplary embodiment.

FIG. 2 is a configuration view of disk drive 100 of the exemplary embodiment.

Exterior casing 120 has a substantially box shape, and has an opening on one side face (right side face in FIG. 2).

Tray 130 is movable between the inside and the outside of exterior casing 120 through the opening. FIG. 2 shows a state where only a portion of tray 130 is stored in exterior casing 120 and most of tray 130 projects from exterior casing 120. Tray 130 includes main face 210, mounting face 220, pickup 230, rail 240, and lid 250.

Mounting face 220 is indented from main face 210, and the indented portion has a substantially circular shape. A disk is mounted on mounting face 220.

Pickup 230 performs reading and writing of data from and to the disk mounted on mounting face 220. Pickup 230 is disposed in the inside of rail 240 which is a recessed portion formed on mounting face 220. Pickup 230 is movable in the inside of rail 240 by an actuator (not shown).

Lid 250 closes the opening of exterior casing 120 when tray 130 is completely stored in exterior casing 120. An upper end face of lid 250 is positioned slightly higher than main face 210.

[1-1-3. Configuration of Stopper]

Figure 3:
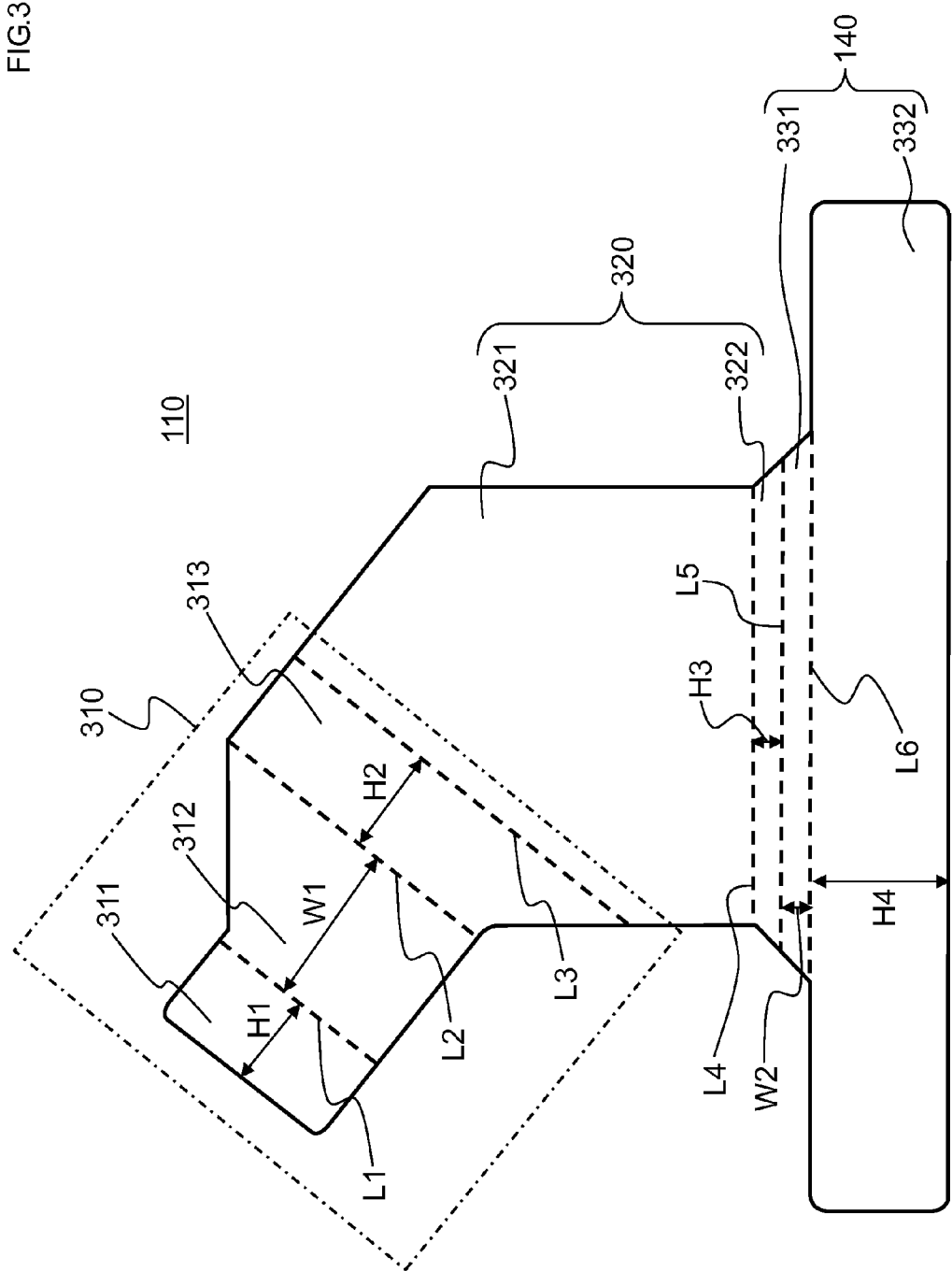
FIG. 3 is a plan view of the stopper of the exemplary embodiment.
Figure 4:
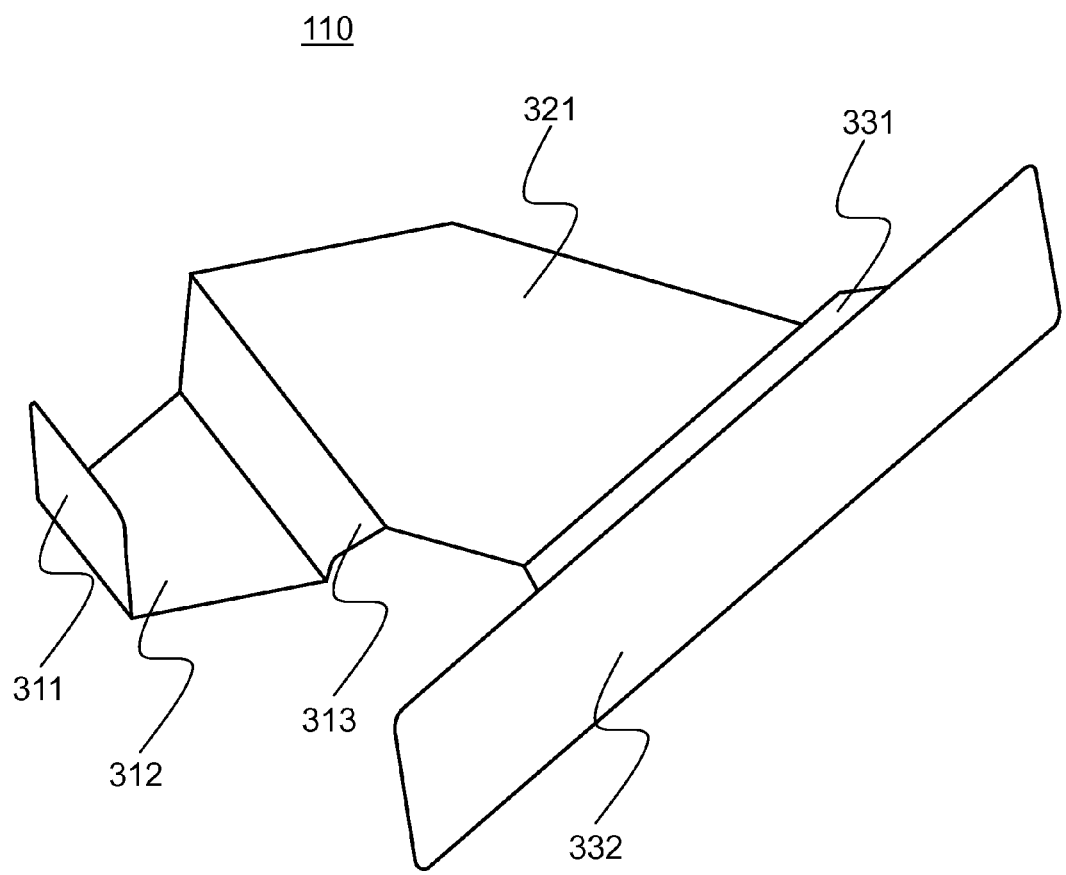
FIG. 4 is a view showing a three-dimensional structure of the stopper of the exemplary embodiment.

FIG. 3 is a plan view of stopper 110 of the exemplary embodiment, and FIG. 4 is a view showing a three-dimensional structure of stopper 110 of the exemplary embodiment.

Stopper 110 is formed by folding a sheet member having a flat plate shape. FIG. 3 shows stopper 110 in a state before the sheet member is folded. The sheet member has a self-restoring property which allows the sheet member to return to a flat plate shape. Here, a self-restoring property which allows the sheet member to return to a flat plate shape means that the sheet member can return to a flat plate state from a folded state when one end is pulled while the other end is fixed with the sheet member held in a folded state. The self-restoring property does not necessarily mean a property in which the sheet member completely returns to a flat plate shape. As described later, it is sufficient for the sheet member to have a self-restoring property which allows the sheet member to return to a flat plate shape to an extent that stopper 110 can be at least pulled out from disk drive 100, that is, to an extent that the sheet member has a thickness which allows stopper 110 to pass through a gap formed between exterior casing 120 and lid 250. In the exemplary embodiment, a plastic sheet having a thickness of 0.2 mm is used as a material for forming stopper 110. However, the material for forming stopper 110 is not limited to the plastic sheet. As the material for forming stopper 110, any material can be used provided that the material has a self-restoring property which allows the sheet member to return to a flat plate shape. For example, a fiber sheet such as paper, a metal foil, or the like may be used as the material for forming stopper 110.

Stopper 110 includes tab portion 140, restricting portion 310, and connecting portion 320 disposed between restricting portion 310 and tab portion 140.

Stopper 110 is folded along folding lines L1, L2, L3, L4, L5, L6.

Restricting portion 310 includes first side face 311, bottom face 312, and second side face 313.

Folding line L1 at a boundary between first side face 311 and bottom face 312 is a valley-fold line. Folding line L2 at a boundary between bottom face 312 and second side face 313 is a valley-fold line. By folding stopper 110 at folding line L1 and folding line L2 approximately 90 degrees, restricting portion 310 is formed into the three-dimensional structure having a substantially U-shaped cross section.

Restricting portion 310 is disposed in the inside of rail 240 of disk drive 100.

First side face 311 has height H1 which is substantially equal to a height of rail 240. Bottom face 312 has width W1 which is smaller than a width of rail 240. Second side face 313 has height H2 which is substantially equal to a height of rail 240.

A portion of connecting portion 320 is disposed on mounting face 220 of disk drive 100. Connecting portion 320 includes bent portion 321 and stepped portion 322. Folding line L3 at a boundary between bent portion 321 and second side face 313 of restricting portion 310 is a mountain-fold line. Folding line L4 at a boundary between bent portion 321 and stepped portion 322 is a valley-fold line. Stepped portion 322 has height H3 which is slightly higher than a height from main face 210 with respect to a height of lid 250. By folding stopper 110 at folding line L3 and folding line L4 approximately 90 degrees, respectively, connecting portion 320 is formed into a three-dimensional structure having a 90-degree-inverted L shape.

Tab portion 140 is a portion which projects through a gap formed between tray 130 and exterior casing 120. Tab portion 140 includes ceiling portion 331 and operation portion 332. Folding line L5 at a boundary between ceiling portion 331 and stepped portion 322 of connecting portion 320 is a mountain-fold line. Folding line L6 at a boundary between ceiling portion 331 and operation portion 332 is a mountain-fold line. Ceiling portion 331 has width W2 substantially equal to a thickness of lid 250. It is preferable that height H4 of operation portion 332 is set to a length by which stopper 110 can be easily taken out from disk drive 100. In the exemplary embodiment, height H4 of operation portion 332 is set to 1 cm.

By folding stopper 110 at folding lines L1, L2, L3, L4, L5, L6 shown in FIG. 3, the three-dimensional structure of stopper 110 shown in FIG. 4 is completed.

[1-1-4. Configuration of Inside of Disk Drive]

Figure 5:
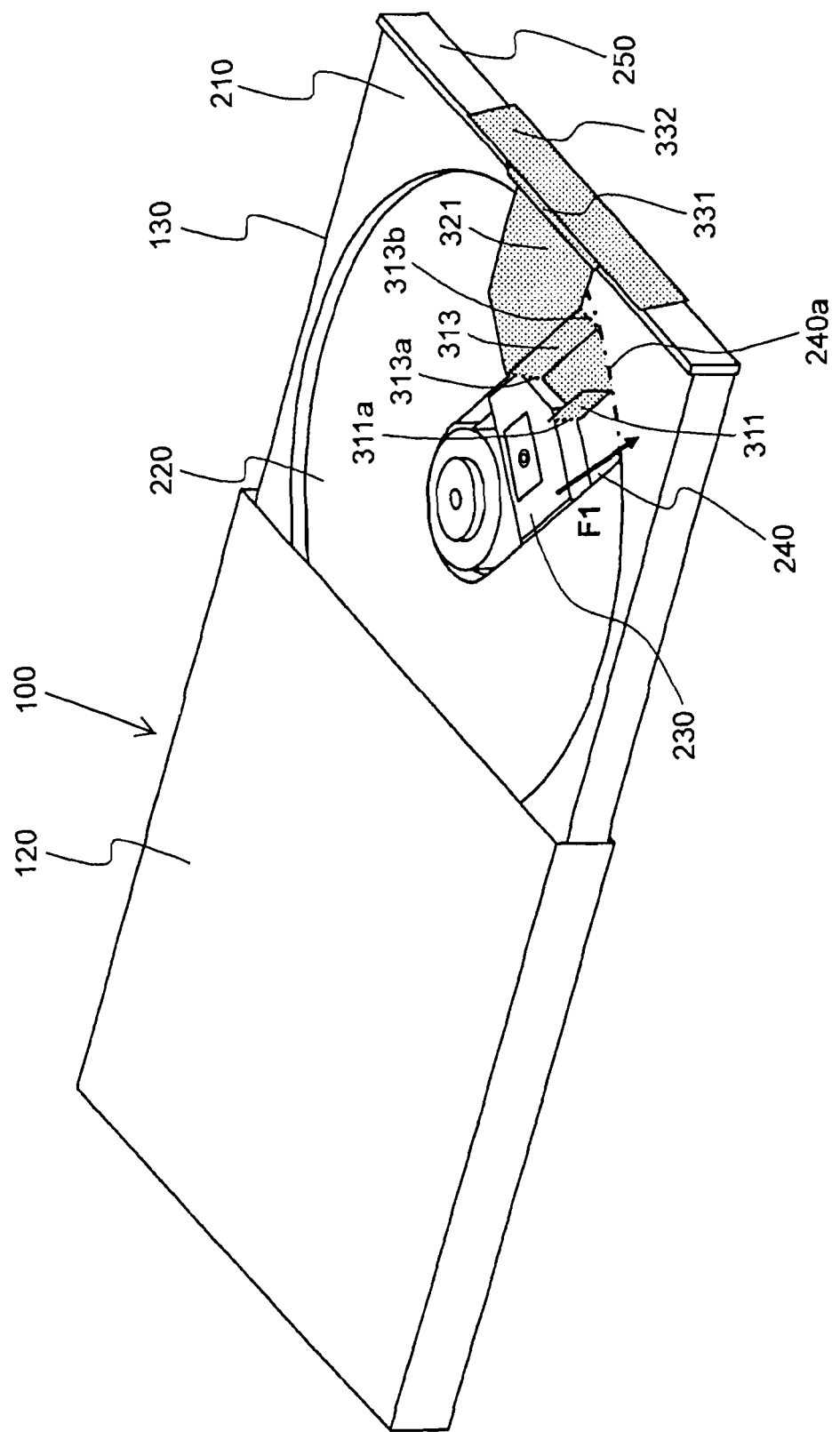
FIG. 5 is a view showing a state where the stopper of the exemplary embodiment is stored in the disk drive in a folded state.

FIG. 5 is a view showing a state where stopper 110 of the exemplary embodiment is stored in disk drive 100 in a folded state.

Restricting portion 310 of stopper 110 is disposed in the inside of rail 240 of disk drive 100. Second side face 313 of restricting portion 310 is brought into contact with a side end of rail 240. One edge 311a of a first side face and one edge 313a of a second side face are brought into contact with pickup 230. One edge 311a of the first side face and one edge 313a of the second side face are portions of restricting portion 310 which are folded toward an upper side of rail 240 from a portion where a bottom face of rail 240 and bottom face 312 of restricting portion 310 overlap with each other, that is, from bottom face 312 of restricting portion 310. The other edge 313b of the second side face is brought into contact with terminal end 240a of the rail.

Bent portion 321 is disposed on mounting face 220 and main face 210.

Ceiling portion 331 of tab portion 140 is disposed on an upper end face of lid 250. Operation portion 332 of tab portion 140 is disposed on an outer face of lid 250.

[1-2. Manner of Operation]

[1-2-1. Manner of Operation when External Force is Applied to Pickup]

The manner of operation when external force F1 is applied to pickup 230 will be described with reference to FIG. 5. For the sake of convenience, in FIG. 5, the manner of operation when external force F1 is applied to pickup 230 in a state where tray 130 projects from exterior casing 120 is described. However, the same operation is performed in the state where tray 130 is stored in exterior casing 120.

External force F1 is a force which tends to move pickup 230 in the direction toward terminal end 240a of the rail. As a situation where external force F1 is applied to pickup 230, a situation where disk drive 100 falls during transportation of disk drive 100 or a situation where disk drive 100 impinges on another object or the like is considered, for example. Stopper 110 is stored in disk drive 100 to prevent such a situation where external force F1 is applied to pickup 230.

When external force F1 acts on pickup 230, pickup 230 tends to move along rail 240. However, as shown in FIG. 5, one edge 311a of the first side face and one edge 313a of the second side face are brought into contact with pickup 230 and hence, the movement of pickup 230 is restricted. The other edge 313b of the second side face is also brought into contact with terminal end 240a of the rail and hence, an amount that stopper 110 itself moves in the direction of external force F1 by being pushed by pickup 230 is extremely small.

[1-2-2. Manner of Operation when Stopper is Pulled out from Disk Drive]

FIG. 6 is a view showing the manner of operation of removing stopper 110 from disk drive 100 of the exemplary embodiment. By holding tab portion 140 in a state shown in FIG. 1 and by pulling the tab portion 140 in direction F2, stopper 110 is removed from disk drive 100. Stopper 110 has a self-restoring property which allows the sheet member to return to a flat plate shape and hence, when stopper 110 in a folded state is pulled in direction F2, stopper 110 is deformed into a substantially flat plate shape, whereby stopper 110 passes through a gap formed between exterior casing 120 and lid 250.

[1-3. Advantageous Effects and the Like]

As described above, in stopper 110 for disk drive 100 according to the exemplary embodiment, disk drive 100 includes: box-shaped exterior casing 120 having the opening on one side face; tray 130 stored in exterior casing 120 and having mounting face 220; pickup 230; and rail 240 being the recessed portion formed on mounting face 220 as the path along which pickup 230 moves. Stopper 110 is formed of a sheet member having a self-restoring property which allows the sheet member to return to a flat plate shape, and includes restricting portion 310, connecting portion 320, and tab portion 140, which are formed by folding the sheet member. When stopper 110 is stored in disk drive 100, restricting portion 310 is disposed in the inside of rail 240, connecting portion 320 is disposed on mounting face 220, and tab portion 140 projects outside through a gap formed between tray 130 and exterior casing 120. Due to such a configuration, the movement of pickup 230 in the direction of external force F1 is restricted by stopper 110 and hence, it is possible to reduce a possibility that pickup 230 impinges on terminal end 240a of the rail so that a function of pickup 230 is impaired. Further, by holding tab portion 140 and pulling out stopper 110 in direction F2, stopper 110 can be removed from disk drive 100. Accordingly, stopper 110 can be easily removed from disk drive 100.

In the exemplary embodiment, restricting portion 310 has at least one portion folded in the inside of rail 240. Due to such a configuration, the structure of stopper 110 is strengthened and a storage property of stopper 110 into rail 240 can be enhanced.

In the exemplary embodiment, restricting portion 310 has first side face 311 and second side face 313 which are portions of restricting portion 310 folded toward the upper side of rail 240 from the bottom face of rail 240. Due to such a configuration, it is possible to reduce a possibility that a portion of restricting portion 310 is caught in a gap formed between pickup 230 and the side face of rail 240.

In the exemplary embodiment, one end of restricting portion 310 is brought into contact with pickup 230. Due to such a configuration, it is possible to restrict the movement of pickup 230 even before external force F1 is applied to pickup 230 and hence, an amount that pickup 230 moves due to external force F1 can be reduced.

In the exemplary embodiment, one end of restricting portion 310 is brought into contact with terminal end 240a of the rail. Due to such a configuration, it is possible to reduce a possibility that stopper 110 is moved in the direction toward terminal end 240a of the rail due to the movement of pickup 230.

What is claimed is:

1. A stopper for a disk drive, the disk drive including:
    a box-shaped exterior casing having an opening on one side face;
    a tray stored in the exterior casing and having a mounting face;
    a pickup; and
    a rail being a recessed portion formed on the mounting face as a path along which the pickup moves,
    wherein the stopper is formed of a sheet member having a self-restoring property which allows the sheet member to return to a flat plate shape, and comprises: a restricting portion; a connecting portion; and a tab portion, which are formed by folding the sheet member, and
    when the stopper is stored in the disk drive, the stopper is disposed such that the restricting portion is disposed in an inside of the rail, the connecting portion is disposed on the mounting face, and the tab portion is disposed so as to project outside through a gap formed between the tray and the exterior casing.

2. The stopper according to claim 1, wherein the restricting portion has at least one portion which is folded in the inside of the rail.

3. The stopper according to claim 1, wherein the restricting portion has a portion which is folded toward an upper side of the rail from a bottom face of the rail.

4. The stopper according to claim 1, wherein one end of the restricting portion is brought into contact with the pickup.

5. The stopper according to claim 1, wherein one end of the restricting portion is brought into contact with a terminal end of the rail.

6. A disk drive on which a stopper is mounted, the disk drive comprising:
    a box-shaped exterior casing having an opening on one side face;
    a tray stored in the exterior casing and having a mounting face;
    a pickup; and
    a rail being a recessed portion formed on the mounting face as a path along which the pickup moves,
    wherein the stopper is formed of a sheet member having a self-restoring property which allows the sheet member to return to a flat plate shape, and comprises: a restricting portion; a connecting portion; and a tab portion, which are formed by folding the sheet member, and
    the restricting portion is disposed in an inside of the rail, the connecting portion is disposed on the mounting face, and the tab portion is disposed so as to project outside through a gap formed between the tray and the exterior casing.

\* \* \* \* \*